Dec. 12, 1933.  H. W. KACHEL  1,939,452
APPARATUS FOR WELDING
Filed June 17, 1929
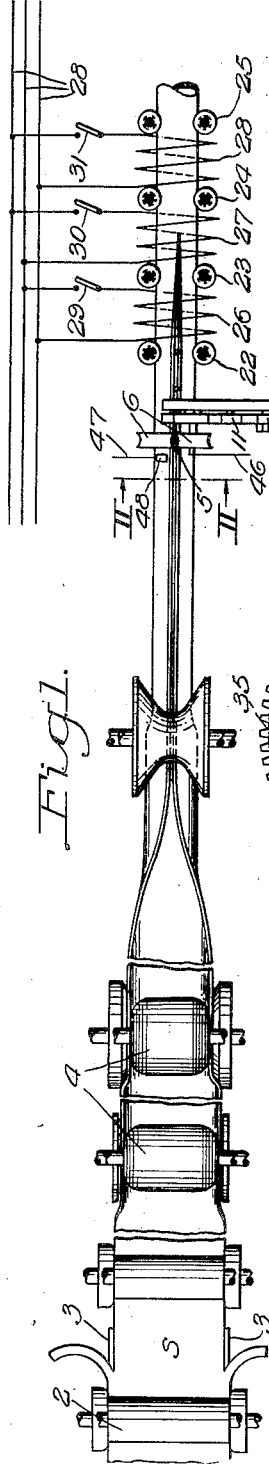
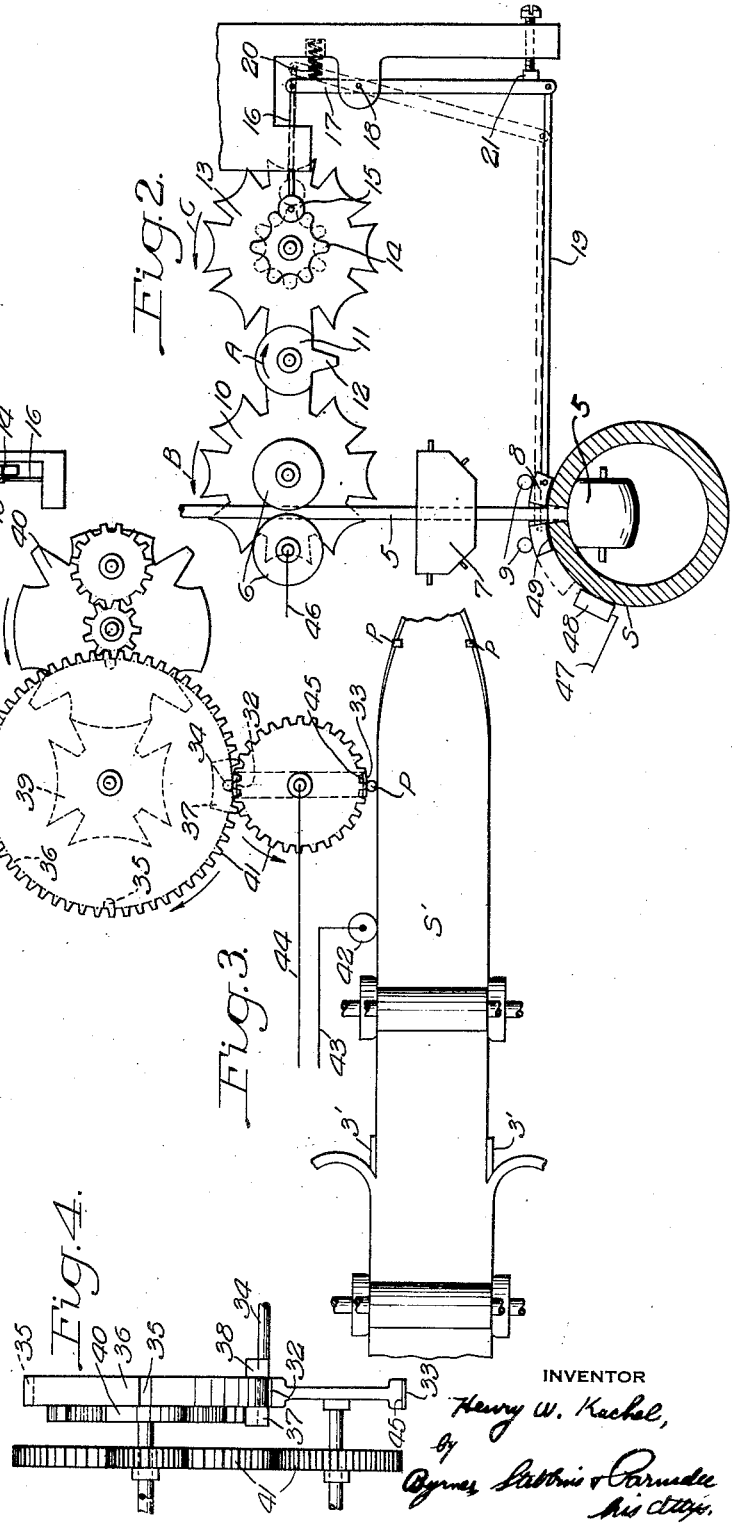
INVENTOR
Henry W. Kachel, Patented Dec. 12, 1933

1,939,452

UNITED STATES PATENT OFFICE 1,939,452

APPARATUS FOR WELDING

Henry W. Kachel, Youngstown, Ohio, assignor to The Youngstown Sheet & Tube Company, Youngstown, Ohio, a corporation of Ohio Application June 17, 1929. Serial No. 371,673

22 Claims. (Cl. 219—4)

The present invention relates broadly to the art of electric welding, and more particularly to an improved apparatus adapted to the rapid production of generally tubular articles such as pipes, cylinders, tubes, and the like. For purposes of definition, such articles will hereinafter be referred to by the term tubes, it being understood that this term is used in its generic sense as inclusive of the various shapes to which the invention is applicable.

At the present time, there is a growing tendency in the art to effect tube formation by means of electric welding, arc welding and induction welding being the two types more commonly utilized.

The electric welding of tubes presents several difficulties inherent in the characteristics of the surfaces which are to be welded, and in the type of contact which is initially established therebetween.

It has heretofore been proposed in the art, not only to first clean the surfaces to be welded, but to thereafter either interpose between such surfaces a filler strip which is subsequently reduced to a molten state and assists in the production of the welded joint, and also to serrate or roughen one or both of the edges to be welded to thereby improve the contact characteristics between such edges. Both types of procedure have inherent desirabilities, and it is one of the objects of the present invention to obtain the combined advantages of both of these types. This is accomplished, in accordance with one embodiment of my invention, by the application to one or both of the edges to be welded, at spaced points, of combined contact and filler pieces, these pieces subsequently determining the initial contact between the edges and thereafter melting down and assisting in the formation of the joint.

In the accompanying drawing, I have shown for purposes of illustration only, and in more or less diagrammatic form, certain preferred embodiments of the present invention.

In the drawing:—

Figure 1 is a diagrammatic top plan view of one embodiment of the present invention;

Figure 2 is a transverse sectional view on the line II—II of Figure 1, looking in the direction of the arrows;

Figure 3 is a view similar to Figure 1, illustrating certain embodiments of the present invention; and Figure 4 is a detail view, on an enlarged scale, partly in elevation and partly in section, illustrating a portion of the shearing mechanism of Figure 3.

In accordance with the form of my invention illustrated in Figures 1 and 2, a piece of skelp S, or other material to be welded, may be passed between suitable feeding rolls 2 to edge shears 3 by means of which the edges, if not already properly trimmed to shape and size, are subjected to the proper operation in this respect. Thereafter, the skelp passes successively through suitable forming means 4, conveniently in the form of roll passes, by means of which it is bent into substantially circular shape, as illustrated, for example, in Figure 2, with the edges in adjacent but slightly spaced relationship. The spacing of the edges at this time is such that there may be received therebetween a succession of contact and filler pieces in the form of pellets, which pellets may be supplied thereto in preformed condition, or which may be successively sheared from a suitable parent body, such as a strip of wire 5.

In accordance with the embodiment of the invention illustrated in Figure 2, the wire 5 passes between feed rolls 6 into a suitable cleaning device, such as a sand blast zone 7, by means of which the outer surface of the wire is thoroughly cleaned. Thereafter, the cleaned wire passes through an opening in a shear blade 8 lying adjacent to the formed skelp and adapted to cooperate therewith in shearing successive pellets from the parent stock. For maintaining the shear blade 8 in proper cooperative relation to the skelp, there may be provided suitable guide rolls 9, causing it, upon actuation thereof, to move in a substantially circular arcuate path, substantially concentric to the periphery of the formed skelp.

For obtaining the desired feeding and shearing operations at successive intervals, the feed rolls 6 may be intergeared in any suitable manner (not shown) for simultaneous rotation in opposite directions. Secured to one of the feeding rolls is a Geneva gear 10, with which cooperates a driving member 11, having a driving tooth 12. This tooth, as well understood in the art, will be intermittently effective for producing a predetermined rotation of the Geneva gear 10.

Also cooperating with the driving member is a second Geneva gear 13, similar in construction to the Geneva gears 10. Assuming the driving member 11 to be continuously rotating in the direction indicated by the arrow A, the Geneva gear 10 and 13, respectively, will be intermittently rotated in the direction indicated by the arrows B and C. Driven by the Geneva gear 13 is a cam 14, with which cooperates a roller 15 on a pitman 16. This pitman has a pivotal connection with one end of a rocking lever 17, having an intermediate pivotal mounting 18. The opposite end of the rocking lever has a pivotal connection to one end of a link 19, the opposite end of which is pivotally connected to the shear blade 8. The rocking lever is normally urged into the position illustrated in Figure 2 by a spring 20, the extent of movement under the influence of the spring being determined by an adjustable stop 21. This stop will be so set that with the shear blade at rest, the wire receiving opening therein will overlie the slot between the adjacent separated edges of the formed skelp.

With the construction just described, rotation of the driving member 11 will effect a predetermined rotation of the feed rolls 6, which will thereby be effective for projecting the wire from its full line position of Figure 2, into its dotted line position of this figure, the projected end being forced between and held by the spaced edges of the formed skelp. Upon conclusion of the feeding movement, the driving member 11 will cooperate with the Geneva gear 13 and effect rotation thereof to operate the cam 14 an amount sufficient to produce one operation of the shear blade 8 and thereby shear the projected end of the wire due to the cooperative relation between the shear blade and the edge of the skelp. Upon conclusion of the shearing movement, the shear blade will return to its full line position of Figure 2, ready for a wire feeding movement.

The speed of operation of the feeding and shearing mechanism may be properly correlated to the speed of movement of the skelp S so that contact and filler pellets will be fed into the opening between the adjacent edges at the desired intervals. Continued movement of the skelp will bring the same into a welding zone herein illustrated as of the induction heating type, comprising a series of spaced pressure rollers 22, 23, 24, and 25, intermediate which may be located sections 26, 27 and 28, of a primary coil. Each of these coils is arranged to be energized, as herein illustrated, by a different one of the phases of a three-phase alternating current circuit 28. Suitable switches 29, 30 and 31 may be utilized for controlling the circuit to any one of the primary sections at will.

As the skelp with the contact pellets thereon comes into the zone of influence of the coils and pressure rollers, a circuit is initially established through the pellets, thus facilitating the striking of the desired arc or flash for heating purposes, the pellets subsequently melting down and entering into the weld under the action of the pressure rollers.

If desired, a suitable abutment 5' in the form of a roller or otherwise, may be suitably positioned within the tube to serve as a positive stop for the feeding movement of the wire. If the characteristics of the tube are such as to require an elongated bearing surface, it will be apparent that the abutment 5' may be replaced by a supporting surface of any other characteristics.

In Figures 3 and 4 there is illustrated a slightly modified form of the invention, in which the pellets are formed independently of the material and subsequently delivered thereto. As illustrated in Figure 3, the skelp S is fed forwardly in a manner similar to that already described. While still in a substantially flat condition, after having passed edge shears 3', it comes into cooperative relationship to the pellet applying mechanism, herein illustrated as comprising a pair of diametrically opposed permanent magnets 32 and 33. The magnet 33 is illustrated as having delivered the pellet P into contact with the edge of the skelp S, while the magnet 32 is illustrated in cooperative relation to the projecting end 34 of a piece of wire stock. This projecting end lies in one of the recesses 35 in the rotatable shear blade 36. On one side of the shear blade is a stop 37, while on the opposite side thereof is a combined guide and shear blade 38 through which the wire 34 is fed in any desired manner by mechanism not herein shown.

Cooperating with the shear 36 is a Geneva gear 39, adapted to be intermittently rotated by a driving member 40 continuously driven in any desired manner.

Under the influence of the driving member 40, the shear blade 36 is rotated to shear from the parent stock a desired length. This sheared length is in contact with the permanent magnet 32, so that upon completion of the shearing operation, it may be carried by that magnet into contact with the edge of the skelp. For maintaining the desired cooperative relation between the permanent magnet and the shear blade, they may be intergeared through the medium of gears 41, these gears having a two-to-one relationship whereby an angular rotation of ninety degrees (90°) of the shear blade 36 will produce an angular rotation of one hundred eighty degrees (180°) of the permanent magnets 32 and 33, this movement being effective for conveying a sheared pellet into cooperative relationship with one edge of the skelp, and bringing the other magnet into cooperative relationship to the succeeding recess in the shearing blade. This operation is repeated in the desired timed relation to the movement of the skelp whereby a succession of pellets is brought into contacting relationship therewith.

In order to hold the pellets in their applied position, there may be provided a fixed contact 42 either of the stationary or roller type, contacting with one edge of the skelp and connected to one side 43 of a suitable electric circuit. The opposite side 44 of the circuit is connected to the electro-magnets as indicated diagrammatically, whereby as soon as a pellet is brought into engagement with the edge of the skelp, a circuit is completed, and the pellet spot welded to the skelp.

In order to prevent this spot welding from also taking place between the electro-magnets and the pellets, the electro-magnets may each be provided with a suitable face 45 of carbon or other material, capable of withstanding temperature conditions created, and of freely disengaging a pellet which has been spot welded in position.

This same spot welding operation may also be applied to construction of the character illustrated in Figure 2 by connecting one of the feed rollers 6, for example, to one side 46 of a suitable electric circuit, and connecting the other side 47 to a contact 48 for engagement with the skelp. With such a construction, the projection of the wire 5 into engagement with the skelp completes the electric circuit and effects a spot welding of the projected end prior to the shearing operation. In such case, a portion of the under side of the shear blade 8 in contact with the skelp may be provided with a suitable insulating material 49, adapted to prevent completion of the circuit through the shear blade until such time as the spot welding of the projected end has been completed, and the shear blade moved into shearing position. It will be understood that the shear blade may be otherwise constructed, of a suitable material, capable of effecting the desired shearing without adherence to the wire being sheared thereby. This may be accomplished, for example, by facing the shearing portion of the blade with a suitable temperature resisting shearing material of a special composition such as those utilizing tungsten carbide.

In accordance with the preferred embodiment of the invention, however, such a spot welding is not utilized where the material is directly delivered into the space between spaced edges of the skelp, inasmuch as the frictional engagement itself is sufficient to maintain the pellets in operative position until such time as they are actually brought into the heating zone.

The present invention possesses the advantage of providing definite contact points between the edges to be welded, thereby defining the characteristics and commencement of the initial heating operation. By properly choosing the pellet forming material and cleaning the same prior to formation of pellets therefrom, the pellets may effect not only a fluxing action, but also a filling action, thereby insuring the production of perfect joints.

While I have herein illustrated and described certain preferred embodiments of the invention, it will be understood that changes in the construction and arrangement of the parts may be made without departing either from the spirit of the invention or the scope of my broader claims.

I claim:

1. Welding apparatus, comprising welding means, skelp feeding and forming means, and mechanism intermediate the forming and welding means cooperating therewith for applying a succession of welding contacts to the skelp along the line to be welded.

2. Welding apparatus comprising skelp feeding and forming means, and means cooperating therewith for applying a succession of welding contacts to the skelp in predetermined spaced relation to each other along the portions which are to be welded after the forming means has acted thereon and prior to welding thereof.

3. Welding apparatus comprising skelp forming, feeding and welding means, and mechanism cooperating therewith, for delivering a succession of welding contacts to said skelp along the portions to be welded and in advance of the welding mechanism.

4. Welding apparatus comprising welding means, and means cooperating therewith for securing spaced contacts to the material along the portions to be welded prior to delivery thereof to said welding means.

5. In a welding apparatus, skelp feeding means, means for feeding and cleaning pellet forming material, pellet forming and applying means cooperating therewith for applying formed pellets to the portion of the skelp to be welded and prior to welding.

6. In a welding apparatus, skelp feeding means and means cooperating therewith for applying pellets prior to welding to the portion of the skelp which is to be welded.

7. The combination with skelp feeding means, of mechanism cooperating therewith for periodically delivering to the skelp edges a succession of contact forming pellets.

8. The combination with skelp feeding means, of mechanism cooperating therewith for periodically delivering to the edge portions of the skelp a succession of contact forming pellets, said mechanism being effective for securing said pellets to the skelp.

9. In an apparatus of the character described, feeding means for the skelp being operated upon, and means for feeding pellet forming material to the skelp, means for cleaning said pellet forming material, and pellet forming and applying means cooperating therewith for applying preformed pellets to the portions of skelp to be welded.

10. Welding apparatus, comprising skelp feeding and forming means, and means cooperating therewith for applying a succession of welding contacts to the portions of skelp to be welded after the forming means has acted on the skelp and prior to welding of the skelp.

11. Welding apparatus, comprising skelp feeding and forming means, and means cooperating therewith for applying a succession of welding contacts to the edge portions of skelp to be welded after the forming means has acted on the skelp and prior to welding of the skelp.

12. In an apparatus of the character described, feeding means for the material being operated upon, and pellet forming and applying means cooperating therewith for applying preformed pellets to the edges of the material.

13. In an apparatus of the character described, feeding means for the material being operated upon, and pellet forming and applying means cooperating therewith for applying preformed pellets to one edge of the material.

14. In an apparatus of the character described, forming means for the material being operated upon for imparting a desired contour thereto, and pellet forming and applying means cooperating therewith for applying pellets to the formed material at the portion to be welded.

15. In an apparatus of the character described, forming means for the material being operated upon for imparting a desired contour thereto, and pellet forming and applying means cooperating therewith for applying pellets to the edge portions of the formed material.

16. In an apparatus of the character described, feeding means for the material being operated upon, and pellet forming means cooperating therewith for welding preformed pellets to predetermined portions of the material.

17. In an apparatus of the character described, feeding means for the material being operated upon, and pellet forming means cooperating therewith for welding preformed pellets to an edge portion of the material.

18. Welding apparatus, comprising means for feeding in a direction axially thereof preformed tubing having the edges in slightly spaced opposed relationship, means for applying to one of said edges a succession of welding contacts, and means for thereafter bringing the edges together about said contacts and welding the tubing.

19. Welding apparatus, comprising means for feeding in a direction axially thereof preformed tubing having the edges in spaced opposed relationship, contact applying means for an edge of said tubing, an electric circuit including said contact applying means and said tubing for spot welding the contacts as they are brought into engagement with the tubing, and means for thereafter closing the edges about said contacts and welding the same.

20. In a welding apparatus, skelp feeding means, pellet feeding means cooperating therewith, an electric circuit including the skelp and the pellet feeding means so arranged as to be closed when a pellet engages the skelp, and means for bringing the edges of the skelp together about said pellets and welding the same.

21. In a welding apparatus, skelp feeding means, intermittently operable means for feeding a succession of pellets to the skelp in said feeding means, means including an electric circuit for spot welding the pellets in position to the skelp, and means for thereafter welding the skelp in position about said pellets.

22. In a welding apparatus, a skelp feeding means, intermittently operable means for feeding a succession of pellets to the skelp in said feeding means, means including an electric circuit for spot welding the pellets in position to the skelp, and means for thereafter welding the skelp in position about said pellets, said pellet feeding means including means for feeding the parent body of material and shearing the same into a succession of pellets.

HENRY W. KACHEL.